United States Patent
Kodama (10) Patent No.: US 7,778,473 B2
(45) Date of Patent: Aug. 17, 2010

(54) IMAGE PROCESSING APPARATUS AND IMAGE PROCESSING METHOD

(75) Inventor: Taku Kodama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 991 days.

(21) Appl. No.: 11/540,858

(22) Filed: Sep. 29, 2006

(65) Prior Publication Data

US 2007/0076962 A1 Apr. 5, 2007

(30) Foreign Application Priority Data

Sep. 30, 2005 (JP) .............................. 2005-285996
Aug. 4, 2006 (JP) .............................. 2006-213611

(51) Int. Cl.
*G06K 9/36* (2006.01)
(52) U.S. Cl. ...................................... 382/232; 382/233
(58) Field of Classification Search ................. 382/232, 382/233; 345/522, 426, 506; 370/536, 311, 370/542, 356, 395.61; 380/212; 725/151; 708/625
See application file for complete search history.

(56) References Cited

U.S. PATENT DOCUMENTS

| 6,728,271 | B1 * | 4/2004 | Kawamura et al. .......... 370/536 |
| 6,772,186 | B1 * | 8/2004 | Tonomura et al. ........... 708/625 |
| 7,103,036 | B2 * | 9/2006 | Yoshihara et al. ........... 370/356 |
| 7,570,267 | B2 * | 8/2009 | Patel et al. .................. 345/522 |

FOREIGN PATENT DOCUMENTS

JP 2002-325257 11/2002

* cited by examiner

*Primary Examiner*—Anh Hong Do
(74) *Attorney, Agent, or Firm*—Blakely, Sokoloff, Taylor & Zafman LLP

(57) ABSTRACT

A disclosed image processing apparatus for compressing image data through multiple operations includes multiple processing units corresponding to the operations. Each of two or more of the processing units includes a regular processing subunit perform regular processing and a simplified processing subunit to perform simplified version of the regular processing; and a control unit to select one of the regular processing subunit and the simplified processing subunit of each of two or more of the processing units to perform a corresponding one of the operations.

4 Claims, 7 Drawing Sheets

DECOMPOSITION_LEVEL_0

FIG.4B

DECOMPOSITION_LEVEL_1

FIG.4C

DECOMPOSITION_LEVEL_2

FIG.4D

DECOMPOSITION_LEVEL_3

IMAGE PROCESSING APPARATUS AND IMAGE PROCESSING METHOD

PRIORITY

The present application is based on and claims priority to Japanese Priority Application No. 2005-285996 filed on Sep. 30, 2005, and Japanese Priority Application No. 2006-213611 filed on Aug. 4, 2006, the entire contents of which are hereby incorporated herein by reference.

BACKGROUND OF THE INVENTION

1. Field of the Invention

The present invention generally relates to an image processing apparatus and an image processing method that compress and decompress an image, and more particularly relates to an image processing apparatus and an image processing method that can flexibly control the speed of image compression and decompression.

2. Description of the Related Art

JPEG 2000 is a new image compression standard having advanced functions. However, because of its advanced functions, its processing work load is high. This problem is especially serious when processing video data in real time.

Japanese Patent Application Publication No. 2002-325257 discloses a technology for decoding in real time video data compressed using JPEG 2000. In this decoding technology, first the luminance Y of a frame is decoded, next the chrominance Cb is decoded, and finally the chrominance Cr is decoded. In the decoding process, the processing time for each component in a frame is monitored and, when the processing time exceeds a time limit, the inverse wavelet transform is cancelled and "simplified processing" is performed to finish decoding the frame within a specified period of time and thereby to avoid dropping frames.

In Japanese Patent Application Publication No. 2002-325257, an example of "simplified processing" is described as follows: When the time limit is exceeded during the processing of a subband (for example, an LH subband), the coefficients in the remaining unprocessed subbands (for example, LH, HL, and HH subbands) are replaced with "0" (nullified). When the time limit is exceeded during the processing of a subband and even the processing of the LL subband is not completed, the processing of the low-order bit-planes of the LL subband is skipped and the coefficients in the LH, HL, and HH subbands are nullified.

However, nullifying subband coefficients and skipping the processing of low-order bit-planes (discarding the low-order bit-planes) in the inverse wavelet transform step as described above may not be enough to improve the processing speed and to reduce the processing work load. Also, since the conventional technology described above controls the decoding process based on the elapsed time, it cannot be used to control the processing speed and the processing work load according to user instructions, characteristics of an image, header information, or the like.

SUMMARY OF THE INVENTION

An image processing apparatus and image processing method are described. In one embodiment, an image processing apparatus for compressing image data through multiple operations, comprises: multiple processing units corresponding to the operates, wherein each of two or more of the processing units includes a regular processing subunit to perform regular processing and a simplified processing subunit to perform a simplified version of the regular processing; and a control unit configured to select one of the regular processing subunit and the simplified processing subunit of the each of two or more of the processing units to perform a corresponding one of the operations.

DESCRIPTION OF THE PREFERRED EMBODIMENTS

Embodiments of the present invention includes an image processing apparatus and an image processing method that substantially obviate one or more problems caused by the limitations and disadvantages of the related art.

Embodiments of the present invention include an image processing apparatus and an image processing method that can flexibly control the processing speed and processing work load of image compression and decompression.

According to an embodiment of the present invention, an image processing apparatus for compressing image data through multiple operations includes multiple processing units corresponding to the operations, wherein each of two or more of the processing units includes a regular processing subunit to perform regular processing and a simplified processing subunit to perform a simplified version of the regular processing; and a control unit to select one of the regular processing subunit and the simplified processing subunit of each of two or more of the processing units to perform a corresponding one of the operations.

Preferred embodiments of the present invention are described below with reference to the accompanying drawings.

Figure 3:
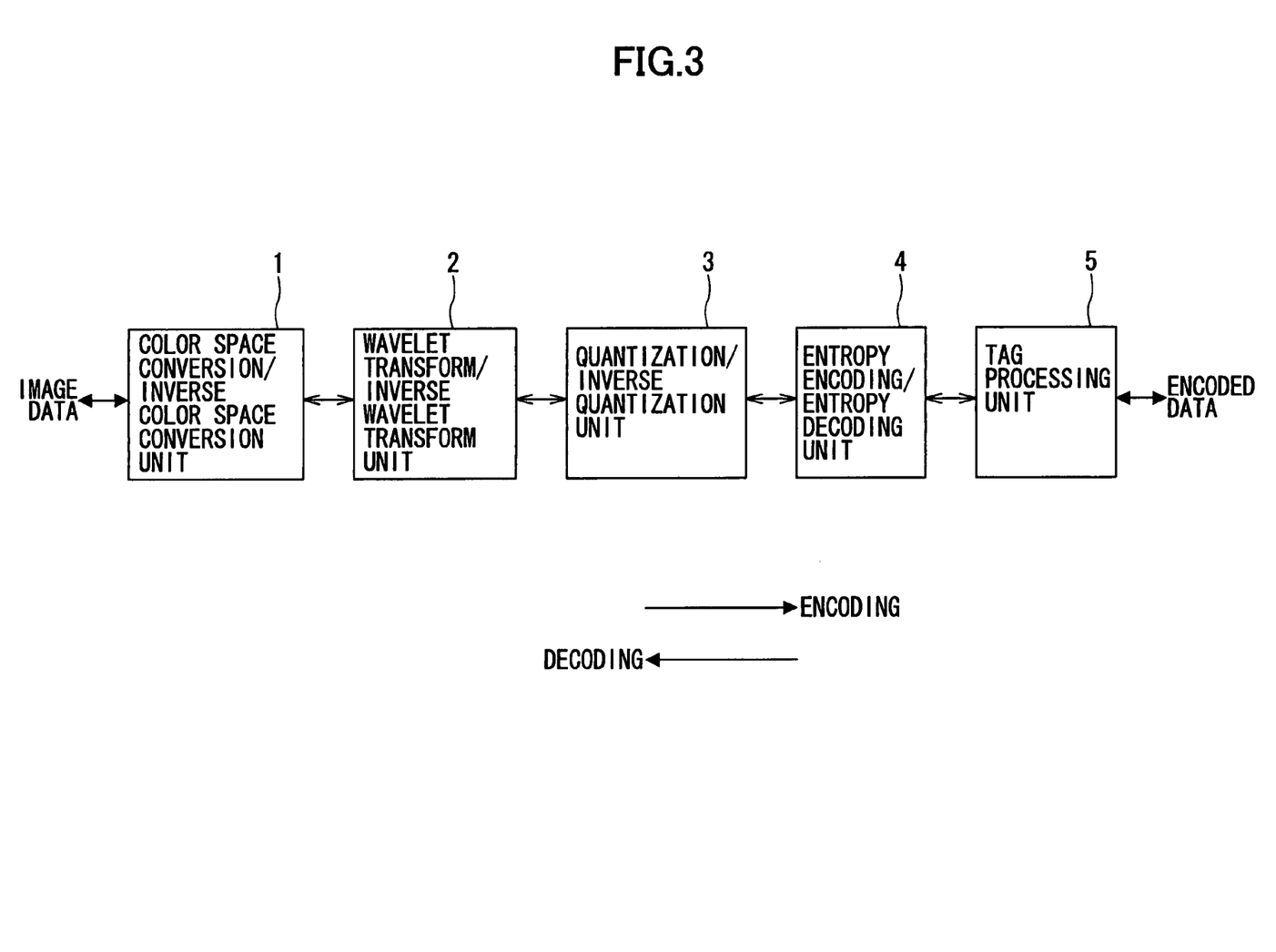
FIG. 3 is a block diagram used to describe the algorithm of JPEG 2000.

The outline of the algorithm of JPEG 2000 is described below. FIG. 3 is a block diagram used to describe the algorithm of JPEG 2000.

First, an exemplary compression (encoding) process of JPEG 2000 is described. An image is divided into rectangular units called tiles for processing (number of tiles≧1). The color space conversion unit of a color space conversion/inverse color space conversion unit 1 converts each tile into components: luminance Y, chrominance Cb, and chrominance Cr. When the image is an RGB image, a DC level shift is performed on the tiles before the color space conversion to reduce the dynamic range in half.

After the color space conversion, the wavelet transform unit of a wavelet transform/inverse wavelet transform unit 2 performs wavelet transform on each of the components (tile components) to divide each of the components into subbands.

Figure 4A:
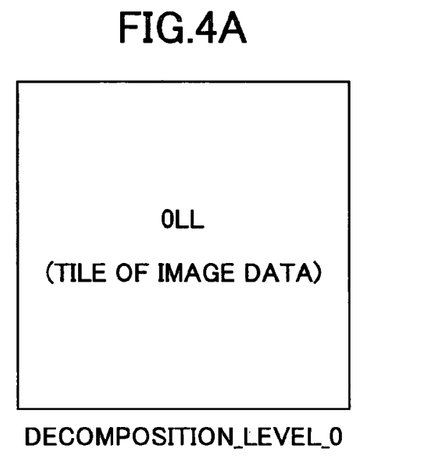
FIGS. 4A, 4B, 4C, and 4D are drawings illustrating an exemplary process of subband decomposition by two-dimensional wavelet transform.
Figure 4B:
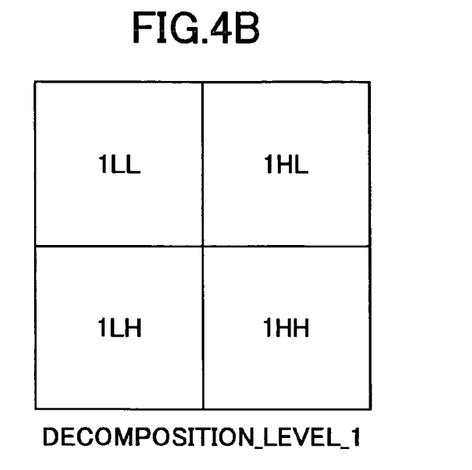
Figure 4C:
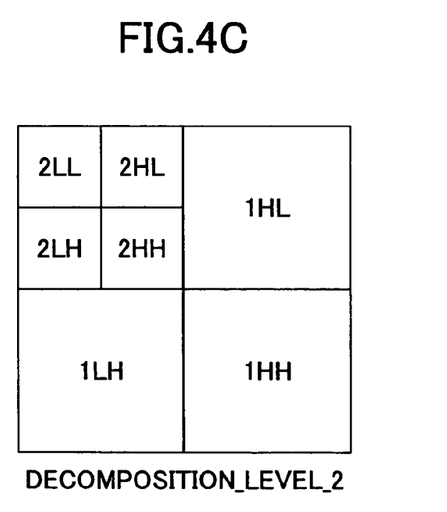
Figure 4D:
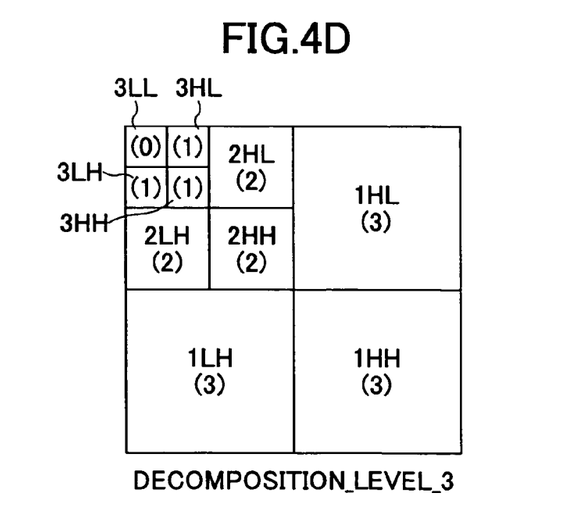

FIGS. 4A, 4B, 4C, and 4D are drawings illustrating an exemplary process of subband decomposition at a decomposition level of 3. A first two-dimensional wavelet transform is performed on the tile component shown in FIG. 4A. As a result, the tile component is divided into subbands (1LL, 1HL, 1LH, 1HH) as shown in FIG. 4B. A second two-dimensional wavelet transform is performed on the coefficients in the 1LL subband, which is a low-frequency component of the decomposition level 1. As a result, the 1LL subband is divided into subbands (2LL, 2HL, 2LH, 2HH) as shown in FIG. 4C. Then, a third two-dimensional wavelet transform is performed on the coefficients in the 2LL subband of the decomposition level 2. As a result, the 2LL subband is divided into subbands (3LL, 3HL, 3LH, 3HH) of the decomposition level 3 as shown in FIG. 4D. The number enclosed in parentheses in each subband indicates a resolution level.

FIG. 3 is referenced again in the descriptions below. The quantization unit of a quantization/inverse quantization unit 3 performs linear quantization on the wavelet coefficients in each of the subbands. However, when a lossless wavelet transform is used, linear quantization is not performed.

Figure 5:
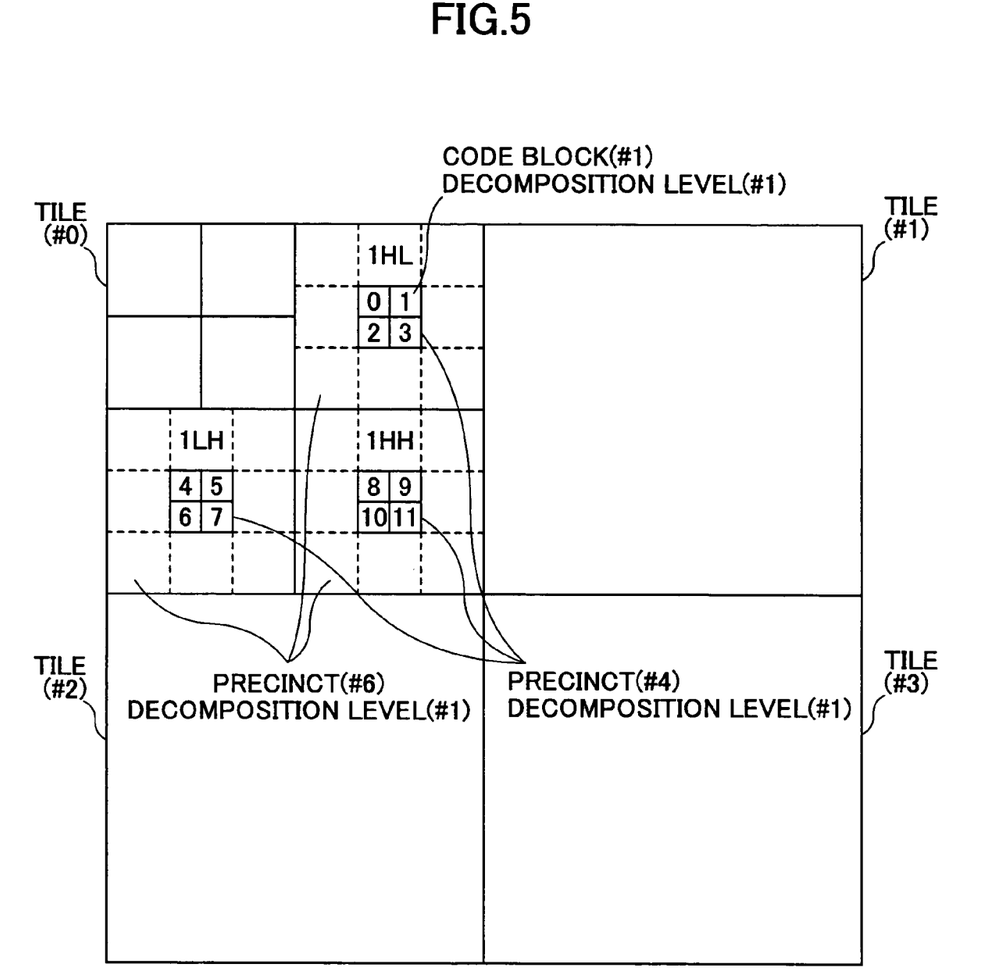
FIG. 5 is a drawing illustrating the relationship between a tile, a precinct, and a code block.

Next, the entropy encoding unit of an entropy encoding/ entropy decoding unit 4 performs entropy encoding on the coefficients in each of the subbands. More specifically, each of the subbands is divided into non-overlapping rectangular regions called precincts as shown in FIG. 5. A precinct is a group of three rectangular regions in the corresponding positions in the LH, HL, and HH subbands of the same decomposition level. In the LL subband, however, a precinct is composed of one rectangular region. Each precinct shows a position of an image area. A precinct is further divided into rectangular code blocks. Entropy encoding is performed code block by code block. In the entropy encoding of JPEG 2000, bit-plane encoding is performed on the wavelet coefficients code block by code block by using an arithmetic encoder called an MQ encoder.

Next, a tag processing unit 5 discards unnecessary entropy codes and generates a packet by combining necessary entropy codes. A packet is composed of a collection of parts of codes in all code blocks in a precinct (for example, codes in the MSB through third bit-planes in all code blocks in a precinct) and a packet header. A packet is a collection of codes that can be treated as a unit. JPEG 2000-encoded data are a collection of packets, where each of the packets is a collection of codes that can be treated as a unit.

A packet includes four indexes (or five indexes if a tile number is included): a component number (color component), a resolution level, a precinct number, and a layer number. The packet header of a packet includes information (described later) on the codes in the packet, but does not include information on the indexes in the packet.

A layer is a collection of packets of all precincts (all code blocks or all subbands) in a tile component. In other words, a layer is a part of codes in the entire tile component (for example, codes in the MSB through third bit-planes of wavelet coefficients in the entire tile component).

Figure 6A:
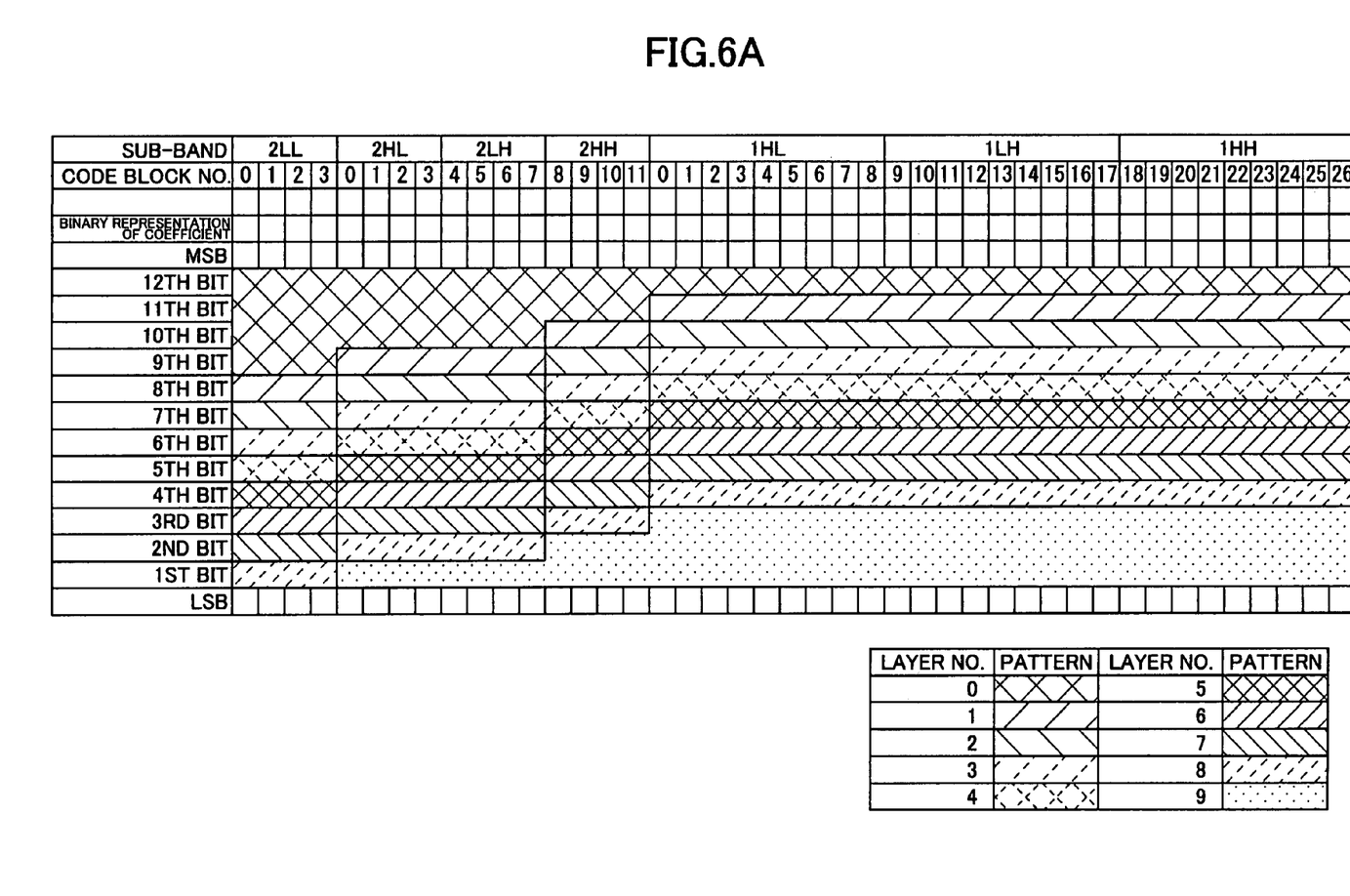
FIGS. 6A and 6B are drawings illustrating exemplary layers and exemplary packets constituting the layers.
Figure 6B:
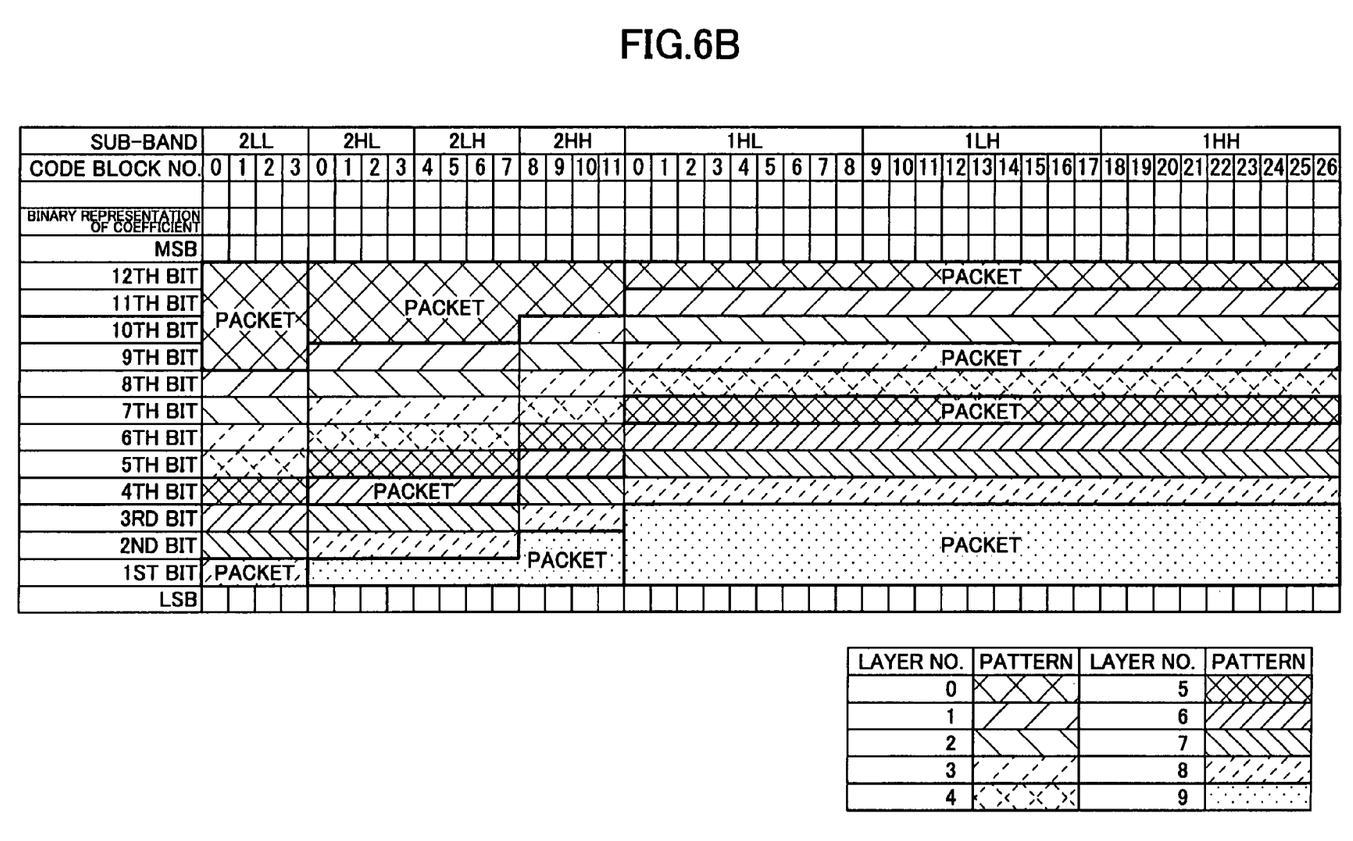

FIG. 6A is a drawing illustrating exemplary layers where the decomposition level is 2 and the size of a precinct is equal to the size of a subband. FIG. 6B is a drawing illustrating exemplary packets constituting the layers. Packets are outlined with bold lines.

Then, the tag processing unit 5 forms JPEG 2000-encoded data (code streams) by hierarchically arranging the generated packets according to the indexes and adding a tag or tag information. The order of arranging packets is called a progression order. Five types of progression orders are defined in JPEG 2000.

Next, an exemplary decompression (decoding) process of JPEG 2000 is described. In the decompression process, the tag processing unit 5 analyzes the tag information of encoded data, divides the encoded data into code streams each corresponding to a tile component, divides each of the code streams into packets, and divides the codes in each of the packets into code blocks. The entropy decoding unit of the entropy encoding/entropy decoding unit 4 performs entropy decoding on each of the code blocks. The above entropy decoding is bit-plane decoding performed using an arithmetic decoder called an MQ decoder. If the encoded data have been linearly quantized in the encoding process, the inverse quantization unit of the quantization/inverse quantization unit 3 performs inverse linear quantization on the quantization coefficients of the wavelet coefficients subband by subband which wavelet coefficients are obtained by the entropy decoding. The inverse wavelet transform unit of the wavelet transform/ inverse wavelet transform unit 2 performs an inverse wavelet transform on the subbands to generate tile components. Then, the inverse color space conversion unit of the color space conversion/inverse color space conversion unit 1 performs inverse color space conversion on the generated tile components to generate tiles. If a DC level shift has been performed in the encoding process, an inverse DC level shift is also performed on the generated tiles.

Embodiments of the present invention are described below.

1. First Embodiment

Figure 1:
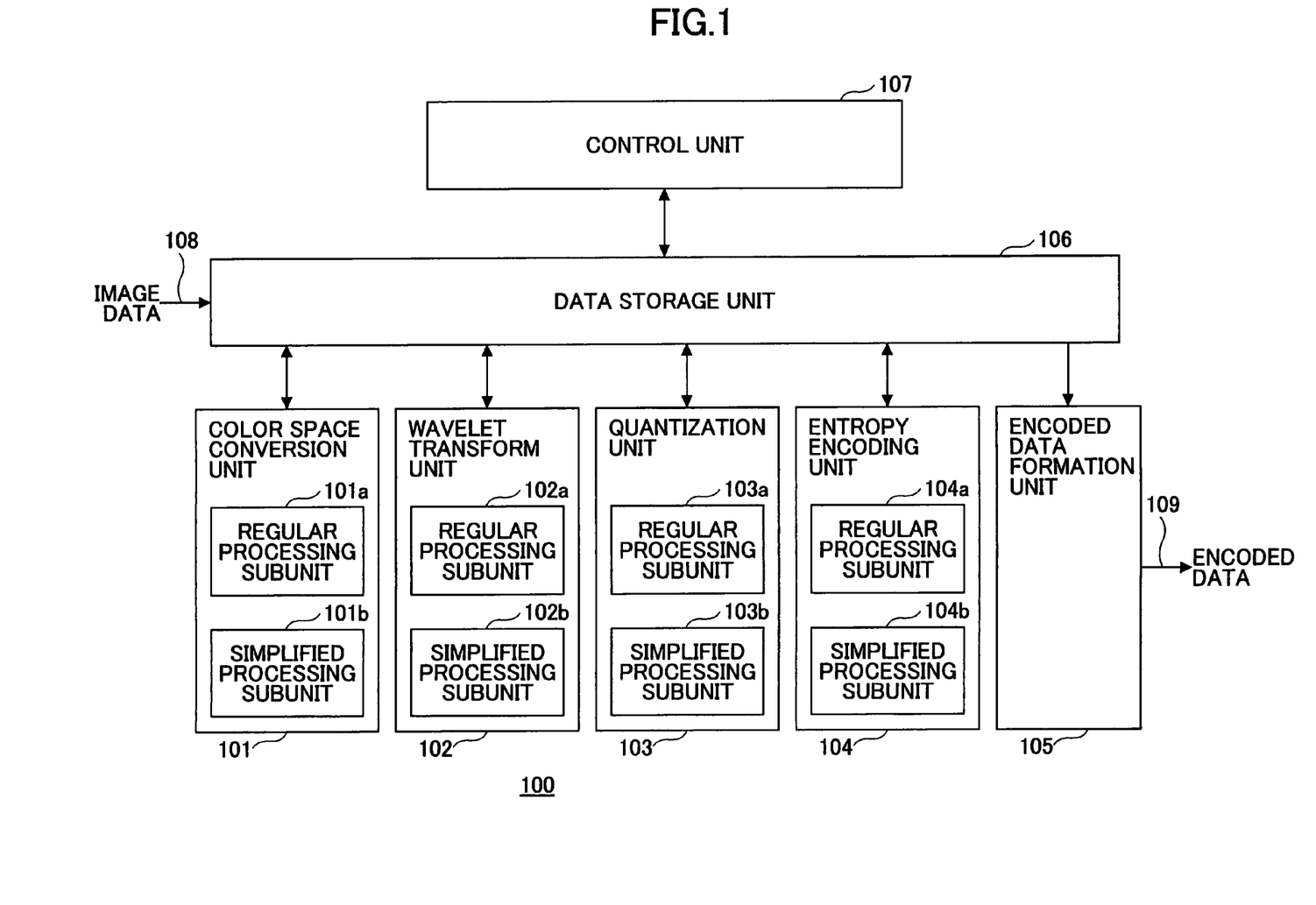
FIG. 1 is a block diagram illustrating an exemplary image processing apparatus according to a first embodiment of the present invention.

FIG. 1 is a block diagram illustrating an exemplary image processing apparatus according to a first embodiment of the present invention. An image processing apparatus 100 inputs image data 108 (for example, RGB image data), compresses the image data 108 using the compression algorithm of JPEG 2000, and thereby generates encoded data 109.

This compression process includes steps of color space conversion, wavelet transform, quantization, entropy encoding, and encoded data formation as described above. The image processing apparatus 100 includes a color space conversion unit 101, a wavelet transform unit 102, a quantization unit 103, an entropy encoding unit 104, and an encoded data formation unit 105 that correspond to the above steps. Each of the units of the image processing apparatus 100 except the encoded data formation unit 105 includes a regular processing subunit for performing regular (original) processing and a simplified processing subunit for performing simplified processing that is a simplified and faster version of the regular processing.

The color space conversion unit 101 includes a regular processing subunit 101a for regular color space conversion and a simplified processing subunit 101b for simplified color space conversion that is faster than the regular color space conversion. The wavelet transform unit 102 includes a regular processing subunit 102a for a regular wavelet transform and a simplified processing subunit 102b for a simplified wavelet transform that is faster than the regular wavelet transform. The quantization unit 103 includes a regular processing subunit 103a for regular quantization and a simplified processing subunit 103b for a simplified quantization that is faster than the regular quantization. The entropy encoding unit 104 includes a regular processing subunit 104a for regular entropy encoding and a simplified processing subunit 104b for simplified entropy encoding that is faster than the regular entropy encoding.

The image processing apparatus 100 further includes a data storage unit 106 for temporarily storing input image data and transient data, and a control unit 107 for controlling input of the image data 108, data transfer between the data storage unit 106 and the units 101 through 105, selection of the regular processing subunits 101a through 104a or the simplified processing subunits 101b through 104b of the units 101 through 104, and transmission of the encoded data 109.

The control unit 107 selects the regular processing subunits 101a through 104a or the simplified processing subunits 101b through 104b of the units 101 through 104 based on user instructions, characteristics of input image data such as resolution, the purpose of the encoded data, or the like. The control unit 107 may also be configured to control the selection according to the status of the compression process of image data.

The image processing apparatus 100 may be implemented by hardware or implemented by a program executed by a computer including a CPU and a memory. Embodiments of the present invention also provide a computer-readable recording medium, such as a magnetic disk, an optical disk, a magnetic optical disk, or a semiconductor storage device, having a program stored therein for causing a computer to provide functions of the units 101 through 105, the data storage unit 106, and the control unit 107.

An exemplary compression process is described below. Since the compression algorithm of JPEG 2000 is described above, the description is omitted here. Descriptions below focus on the compression process relating to an embodiment of the present invention.

The control unit 107 reads the image data 108 and stores the image data 108 in the data storage unit 106. The image data 108 may be a still image or a video frame.

The control unit 107 selects either the regular processing subunit 101a or the simplified processing subunit 101b of the color space conversion unit 101, and transfers image data for processing by the selected subunit from the data storage unit 106 to the color space conversion unit 101. The color space conversion unit 101 performs regular color space conversion or a simplified color space conversion on the image data depending on whether the regular processing subunit 101a or the simplified processing subunit 101b is selected, and outputs the converted image data (Y, Cb, and Cr data). The control unit 107 temporarily stores the converted image data in the data storage unit 106.

The control unit 107 selects either the regular processing subunit 102a or the simplified processing subunit 102b of the wavelet transform unit 102, and transfers the converted image data for processing by the selected subunit from the data storage unit 106 to the wavelet transform unit 102. The wavelet transform unit 102 performs a regular wavelet transform or a simplified wavelet transform on the converted image data depending on whether the regular processing subunit 102a or the simplified processing subunit 102b is selected, and outputs wavelet coefficient data. The control unit 107 temporarily stores the wavelet coefficient data in the data storage unit 106.

The control unit 107 selects either the regular processing subunit 103a or the simplified processing subunit 103b of the quantization unit 103, and transfers the wavelet coefficient data for processing by the selected subunit from the data storage unit 106 to the quantization unit 103. The quantization unit 103 performs regular quantization or simplified quantization on the wavelet coefficient data depending on whether the regular processing subunit 103a or the simplified processing subunit 103b is selected, and outputs quantized wavelet coefficient data. The control unit 107 temporarily stores the quantized wavelet coefficient data in the data storage unit 106.

The control unit 107 selects either the regular processing subunit 104a or the simplified processing subunit 104b of the entropy encoding unit 104, and transfers the quantized wavelet coefficient data for processing by the selected subunit from the data storage unit 106 to the entropy encoding unit 104. The entropy encoding unit 104 performs regular entropy encoding or simplified entropy encoding on the quantized wavelet coefficient data depending on whether the regular processing subunit 104a or the simplified processing subunit 104b is selected, and outputs entropy codes. The control unit 107 temporarily stores the entropy codes in the data storage unit 106.

Then, the control unit 107 transfers the entropy codes from the data storage unit 106 to the encoded data formation unit 105. The encoded data formation unit 105 collects multiple sets of the entropy codes, generates packets from the multiple sets of the entropy codes, and forms encoded data (code streams) in a specific format by arranging the packets in a specified order and adding a tag or tag information. The control unit 107 outputs the encoded data to the outside. The control unit 107 may also be configured to temporarily store the encoded data in the data storage unit 106 and then to output the encoded data to the outside.

Exemplary processing by the regular processing subunits 101a through 104a and the simplified processing subunits 101b through 104b is described below.

The color space conversion unit 101 converts RGB components into a luminance component Y, a chrominance component Cb, and a chrominance component Cr. The regular processing subunit 101a performs a regular color space conversion using, for example, the following formulas:

$$Y = 0.257R + 0.504G + 0.098B + 16$$

$$Cb = -0.148R - 0.291G + 0.489B + 128$$

$$Cr = 0.439R - 0.368G - 0.071B + 128 \quad (1)$$

The simplified processing subunit 101b performs a simplified color space conversion that is faster than the regular color space conversion. The following are examples of the simplified color space conversion:

(a) Formulas (1) are calculated using only a part of significant digits. For example, formulas (1) are calculated using only the eight high-order bits of each of the R, G, and B values and only the eight high-order bits of each of the Y, Cb, and Cr values are stored in the data storage unit 106. Also, the degree of simplification may be determined separately for each of the color components depending on its contribution to the image quality. Such simplified processing results in an increased number of data sets on which calculations can be performed concurrently by using, for example, a SIMD instruction and therefore provides faster processing speed than the regular processing.

(b) Formulas themselves are simplified. For example, simplified color space conversion is performed using the following formulas:

$$Y = 0.26R + 0.50G + 0.10B + 16$$

$$Cb = -0.15R - 0.29G + 0.49B + 128$$

$$Cr = 0.44R - 0.37G - 0.07B + 128 \quad (2)$$

or $$Y = 0.267R + 0.504G + 0.098B + 16$$

$$Cb = 0$$

$$Cr = 0 \quad (3)$$

The wavelet transform unit 102 performs two-dimensional wavelet transform on each of the Y, Cb, and Cr components by first performing a wavelet transform in the vertical direction and then performing a wavelet transform in the horizontal direction.

The regular processing subunit 102a performs the two-dimensional wavelet transform by using a formula FL( ) for low-frequency components and a formula FH( ) for high-frequency components as shown below.

$$L(n) = FL(n) \\ = Y(2n) - \text{Floor}((Y(2n-1) + Y(2n+1) + 2)/4) \quad (4)$$

$$H(n) = FH(n) \\ = Y(2n+1) + \text{Floor}((L(n) + L(n+1))/2)$$

Formulas for the two-dimensional wavelet transform are expressed as follows:

$$LL(n)=L(L(n))$$

$$HL(n)=H(L(n))$$

$$LH(n)=L(H(n))$$

$$HH(n)=H(H(n)) \quad (5)$$

A regular wavelet transform is performed as described above.

The simplified processing subunit 102b performs a simplified wavelet transform. For example, the simplified wavelet transform is performed using the following formulas:

$$LL(n)=L(L(n))$$

$$HL(n)=0$$

$$LH(n)=0$$

$$HH(n)=0 \quad (6)$$

Or $$LL(n)=L(L(n))$$

$$HL(n)=H(L(n))$$

$$LH(n)=0$$

$$HH(n)=0 \quad (7)$$

Also, as in the simplified color space conversion, the simplified wavelet transform may also be performed by calculating the formulas (5) using only the eight high-order bits of each component.

The regular processing subunit 103a of the quantization unit 103 performs linear quantization on each subband where wavelet coefficients in each subband are divided by the number of quantization steps, where the number is unique to each subband. The simplified processing subunit 103b performs similar linear quantization, for example, by using only the eight high-order bits of wavelet coefficients. Also, the simplified processing subunit 103b may be configured to perform the same linear quantization as in the regular quantization on some of the subbands and to perform linear quantization on the other subbands with a quantization value 0.

The regular processing subunit 104a of the entropy encoding unit 104 performs arithmetic encoding called MQ encoding on the quantized wavelet coefficients bit-plane by bit-plane from the high-order bits to the low-order bits. The simplified processing subunit 104b, for example, performs the MQ coding only on some of the high-order bits of the quantized wavelet coefficients or sets all the values in the low-order bit planes of the quantized wavelet coefficients to 0 and performs the MQ coding. The results of encoding the low-order bit planes that are set to 0 may be preset.

The descriptions in the first embodiment may be applied to an image processing method of compressing image data according to an embodiment of the present invention by replacing the units 101 through 104 shown in FIG. 1 with compression processing steps and replacing the regular processing subunits 101a through 104a and the simplified processing subunits 101b through 104b with regular processing sub-steps and simplified processing sub-steps in the compression processing steps.

2. Second Embodiment

Figure 2:
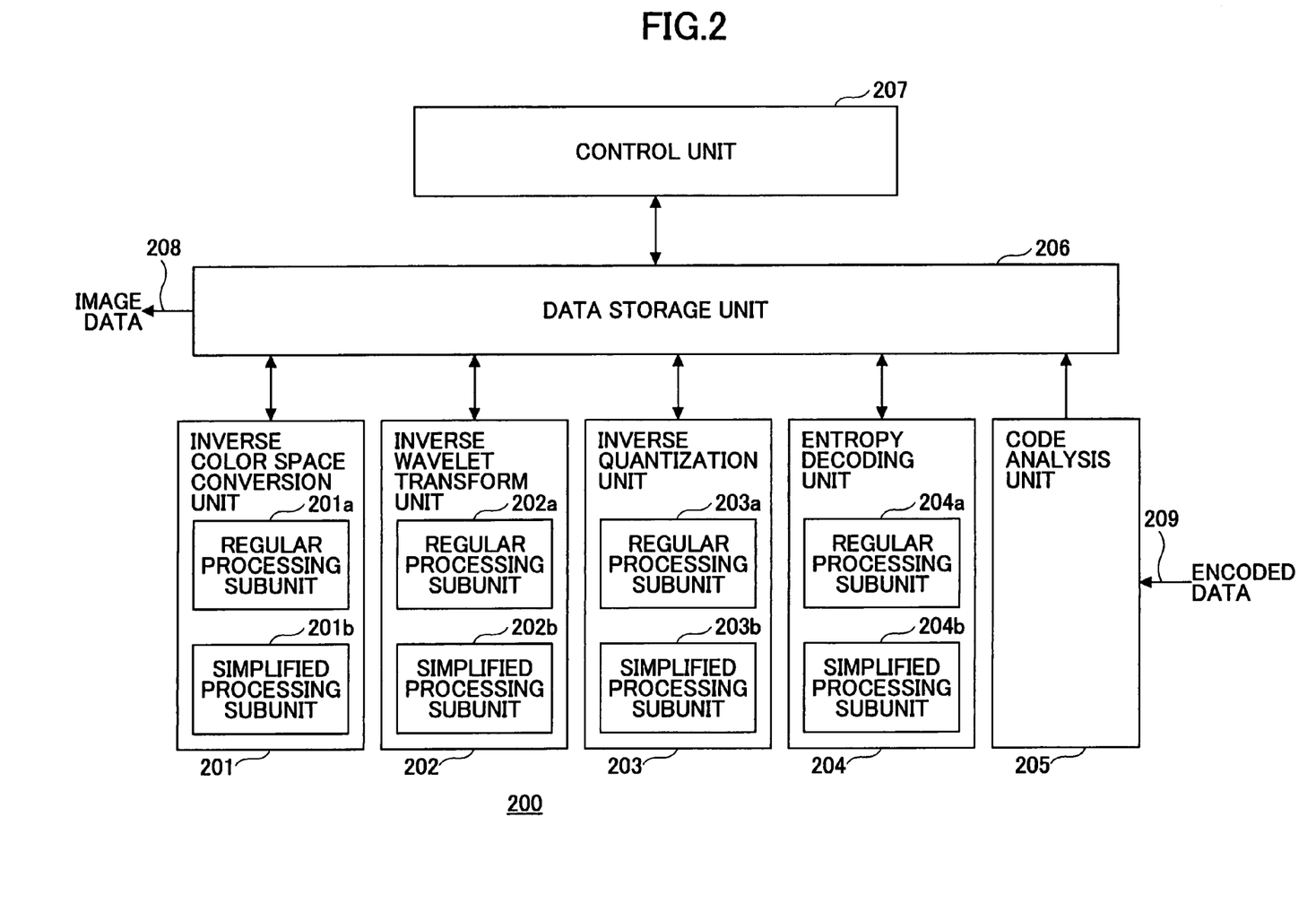
FIG. 2 is a block diagram illustrating an exemplary image processing apparatus according to a second embodiment of the present invention.

FIG. 2 is a block diagram illustrating an exemplary image processing apparatus according to a second embodiment of the present invention. An image processing apparatus 200 inputs encoded data 209 encoded with JPEG 2000, decompresses the encoded data 209 using the decompression algorithm of JPEG 2000, and thereby generates image data 208.

This decompression process includes steps of code analysis, entropy decoding, inverse quantization, inverse wavelet transform, and inverse color space conversion as described earlier. The image processing apparatus 200 includes a code analysis unit 205, an entropy decoding unit 204, an inverse quantization unit 203, an inverse wavelet transform unit 202, and an inverse color space conversion unit 201 that correspond to the above mentioned steps. Each of the units in the image processing apparatus 200 except the code analysis unit 205 includes a regular processing subunit for performing regular (original) processing and a simplified processing subunit for performing simplified processing that is a simplified and faster version of the regular processing.

The inverse color space conversion unit 201 includes a regular processing subunit 201a for regular inverse color space conversion and a simplified processing subunit 201b for a simplified inverse color space conversion that is faster than the regular inverse color space conversion. The inverse wavelet transform unit 202 includes a regular processing subunit 202a for a regular inverse wavelet transform and a simplified processing subunit 202b for a simplified inverse wavelet transform that is faster than the regular inverse wavelet transform. The inverse quantization unit 203 includes a regular processing subunit 203a for regular inverse quantization and a simplified processing subunit 203b for simplified inverse quantization that is faster than the regular inverse quantization. The entropy decoding unit 204 includes a regular processing subunit 204a for regular entropy decoding and a simplified processing subunit 204b for a simplified entropy decoding that is faster than the regular entropy decoding.

The image processing apparatus 200 further includes a data storage unit 206 for temporarily storing encoded data, transient data, and decompressed image data; and a control unit 207 for controlling input of the encoded data 209, data transfer between the data storage unit 206 and the units 201 through 205, selection of the regular processing subunits 201a through 204a or the simplified processing subunits 201b through 204b in the units 202 through 204, and transmission of the decompressed image data 208.

The control unit 207 selects the regular processing subunits 201a through 204a or the simplified processing subunits 201b through 204b in the units 201 through 204 based on user instructions, characteristics of the encoded data 209 such as resolution, where the characteristics can be obtained from tag information (header information) in the encoded data 209, the purpose of the decompressed image data 208, or the like. The control unit 207 may also be configured to control the selection according to the status of the decompression process of encoded data.

The image processing apparatus 200 may be implemented by hardware or implemented by a program executed by a computer including a CPU and a memory. Embodiments of the present invention also provide a computer-readable recording medium, such as a magnetic disk, an optical disk, a magnetic optical disk, or a semiconductor storage device, having a program stored therein for causing a computer to provide functions of the units 201 through 205, the data storage unit 206, and the control unit 207.

An exemplary decompression process is described below. Since the decompression algorithm of JPEG 2000 is already described, the description is omitted here. Descriptions below focus on the decompression process relating to an embodiment of the present invention.

The control unit 207 inputs the encoded data 209 into the code analysis unit 205. The code analysis unit 205 analyzes the tag information in the encoded data 209, divides the encoded data 209 into code streams each corresponding to a component, and transfers the code streams to the data storage unit 206. The code analysis unit 205 also transfers the results of the tag information analysis to the data storage unit 206. The transfer of data from the code analysis unit 205 to the data storage unit 206 is controlled by the control unit 207. The encoded data 209 may be an encoded still image or an encoded video frame.

The entropy decoding unit 204 performs entropy decoding on the code streams each corresponding to a component. Prior to the entropy decoding, the control unit 207 selects either the regular processing subunit 204a or the simplified processing subunit 204b and transfers codes for processing by the selected subunit from the data storage unit 206 to the entropy decoding unit 204. The entropy decoding unit 204 performs regular entropy decoding (MQ decoding) or simplified entropy decoding on the codes depending on whether the regular processing subunit 204a or the simplified processing subunit 204b is selected, and outputs wavelet coefficient data. The control unit 207 temporarily stores the wavelet coefficient data in the data storage unit 206. The positions of bits to be decoded are determined in the order determined based on the tag information. The bits are decoded according to context information that is generated based on the status of other bits (bits that are already decoded and stored in the data storage unit 206) situated around the bits to be decoded. The context information may be generated by the entropy decoding unit 204 or the inverse quantization unit 203. When context information is generated by the inverse quantization unit 203, the context information is transferred directly or via the data storage unit 206 to the entropy decoding unit 204.

The inverse quantization unit 203 performs inverse quantization on the wavelet coefficient data. Prior to the inverse quantization, the control unit 207 selects either the regular processing subunit 203a or the simplified processing subunit 203b and transfers the wavelet coefficient data for processing by the selected subunit from the data storage unit 206 to the inverse quantization unit 203. The inverse quantization unit 203 performs regular inverse quantization or simplified inverse quantization on the wavelet coefficient data depending on whether the regular processing subunit 203a or the simplified processing subunit 203b is selected, and outputs inverse quantized wavelet coefficient data. The control unit 207 temporarily stores the inverse quantized wavelet coefficient data in the data storage unit 206.

The inverse wavelet transform unit 202 an performs inverse wavelet transform on the inverse quantized wavelet coefficient data. Prior to the inverse wavelet transform, the control unit 207 selects either the regular processing subunit 202a or the simplified processing subunit 202b and transfers the inverse quantized wavelet coefficient data for processing by the selected subunit from the data storage unit 206 to the inverse wavelet transform unit 202. The inverse wavelet transform unit 202 performs the regular inverse wavelet transform or the simplified inverse wavelet transform on the inverse quantized wavelet coefficient data depending on whether the regular processing subunit 202a or the simplified processing subunit 202b is selected, and outputs image data (Y, Cb, and Cr data). The control unit 207 temporarily stores the image data (Y, Cb, and Cr data) in the data storage unit 206.

The inverse color space conversion unit 201 performs inverse color space conversion on the image data (Y, Cb, and Cr data) and thereby generates RGB image data. Prior to the inverse color space conversion, the control unit 207 selects either the regular processing subunit 201a or the simplified processing subunit 201b and transfers the image data for processing by the selected subunit from the data storage unit 206 to the inverse color space conversion unit 201. The inverse color space conversion unit 201 performs the regular inverse color space conversion or the simplified inverse color space conversion on the image data depending on whether the regular processing subunit 201a or the simplified processing subunit 201b is selected, and outputs RGB image data. The control unit 207 temporarily stores the RGB image data in the data storage unit 206 and then sends the RGB image data as the image data 208 to the outside.

The units 201 through 204 shown in FIG. 2 perform the inverse of the processing performed by the corresponding units 101 through 104 shown in FIG. 1. Therefore, the relationship between the regular processing performed by the regular processing subunits 201a through 204a of the units 201 through 204 and the simplified processing performed by the simplified processing subunits of the units 201 through 204 is similar to the relationship between the regular processing and the simplified processing performed by the corresponding subunits of the units 101 through 104 shown in FIG. 1.

The descriptions in the second embodiment may be applied to an image processing method of decompressing encoded data according to an embodiment of the present invention by replacing the units 201 through 204 of the image processing apparatus 200 with decompression processing steps and replacing the regular processing subunits 201a through 204a and the simplified processing subunits 201b through 204b with regular processing sub-steps and simplified processing sub-steps in the compression processing steps.

Although the compression and decompression algorithms of JPEG 2000 are used in the above described embodiments, the present invention may be embodied using other compression and decompression algorithms.

Embodiments of the present invention provide an image processing apparatus for compressing or decompressing image data which image processing apparatus makes it possible to flexibly control the processing speed and processing work load of compression or decompression by selecting a regular processing subunit or a simplified processing subunit of a processing unit according to user instructions, resolution of the image data, the purpose of the image data, or the like.

The present invention is not limited to the specifically disclosed embodiments, and variations and modifications may be made without departing from the scope of the present invention.

What is claimed is:

1. An image processing apparatus for compressing image data, comprising:

multiple processing units configured to perform different operations for compressing the image data, wherein each of two or more of the processing units includes a regular processing subunit to perform regular processing and a simplified processing subunit to perform a simplified version of the regular processing; and a control unit to select one of the regular processing subunit and the simplified processing subunit of said each of two or more of the processing units to perform a corresponding one of the operations.

2. An image processing apparatus for decompressing encoded data, comprising:

multiple processing units configured to perform different operations for decompressing the encoded data, wherein each of two or more of the processing units includes a regular processing subunit to perform regular processing and a simplified processing subunit to perform a simplified version of the regular processing; and a control unit to select one of the regular processing subunit and the simplified processing subunit of said each of two or more of the processing units to perform a corresponding one of the operations.

3. An image processing method of compressing image data, comprising:

different processing steps for compressing the image data, wherein each of two or more of the processing steps includes a regular processing sub-step of performing regular processing and a simplified processing sub-step of performing simplified version of the regular processing; and selecting and performing, using a microprocessor, one of the regular processing sub-step and the simplified processing sub-step of said each of two or more of the processing steps.

4. An image processing method of decompressing encoded data, comprising:

different processing steps for decompressing the encoded data, wherein each of two or more of the processing steps includes a regular processing sub-step of performing regular processing and a simplified processing sub-step of performing simplified version of the regular processing; and selecting and performing, using a microprocessor, one or the regular processing sub-step and the simplified processing sub-step of said each of two or more of the processing steps.

* * * * *